Sept. 7, 1948.  E. E. VAN DYKE ET AL  2,448,847
CONTROL CABLE FOR AIRCRAFT
Filed May 9, 1944
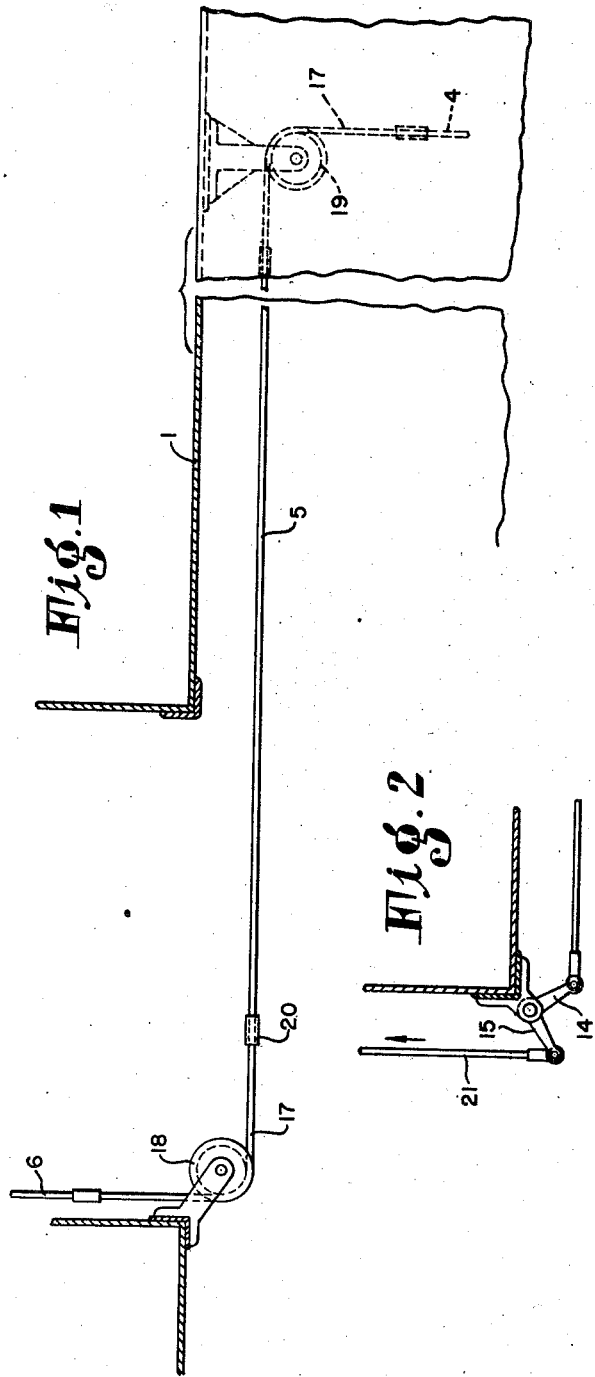
INVENTORS
EDWARD E. VAN DYKE
KINGDON KERR
BY
ATTORNEY Patented Sept. 7, 1948

2,448,847

UNITED STATES PATENT OFFICE 2,448,847

CONTROL CABLE FOR AIRCRAFT

Edward E. Van Dyke, Sherman Oaks, and Kingdon Kerr, Los Angeles, Calif., assignors to Douglas Aircraft Company, Inc., Santa Monica, Calif., a corporation of Delaware Application May 9, 1944, Serial No. 534,746

7 Claims. (Cl. 244—1)

This invention relates to cables of the type used in aircraft controls, and has for its object to avoid difficulties and drawbacks now being encountered in the present practice in the construction, installation and operation of cables employed in aircraft controls.

The difficulties referred to above are largely due to the high variations in temperature to which aircraft are subjected in practical operation, which may range from 120° Fahrenheit or thereabouts for the high temperature, down to minus 70° Fahrenheit or thereabouts for the low temperature. The metal employed in aircraft frames and plating is usually Duralumin, on account of course of its lightness and great strength. But its coefficient of expansion is very different from that of the steel employed in control cables. This difference in the coefficients of expansion brings about dangerous changes in the tension of the control cables under the extreme changes of temperature to which they are subjected. This of course suggests making the contol cables of an aluminum alloy. But it is not practicable to employ a cable of aluminum alloy for many reasons, one of which is that it will not bend readily to the periphery of the small guide pulleys that must be employed for guiding the cable runs.

Probably the most dangerous condition that can arise is due to the presence of slack in such control cables. Such a condition of slackness is greatly aggravated due to the fact that the long runs of control cables must extend longitudinally with structural elements of the aircraft, such as the fuselage and the wings. When slack such as referred to occurs, there is great danger that it will develop fluttering of the control surfaces and this of course would cause great difficulty in controlling the aircraft.

Another result of slack in a control cable is that it lends itself to the development of excessive vibration, in runs of the cable between fairleads, thereby causing friction in the fairleads, that makes the handling of the controls more difficult.

In accordance with the present practice, in order to reduce to a reasonable degree the slack in cables now being installed in aircraft, an initial tension, or "stretch," is given the cable on installation, and this stretch of course has to be resisted by all guide structures, such as pulleys and brackets, associated with the cable, and by the construction at the anchor points at the ends of the cable. This original rigging "stretch" is usually between 60 to 100 pounds in the larger and more powerful airplanes. One of the objects of this invention is to provide means for overcoming these difficulties referred to above, and particularly to provide a cable construction which will enable the original rigging stretch, when the cable is installed, to be reduced to a relatively low figure, e. g., approximately 25 pounds.

Another difficulty arising from the use of steel cables in accordance with the present practice, is that in a highly maneuverable airplane which must be capable of extended dives and rapid pull-outs from the dives, the control surfaces may have to sustain loads far in excess of the normal loads to which they are subjected, and such excessive loads on the control cables may run in excess of 200 pounds per square foot. Under such loads, a steel cable which is sufficiently heavy to take initial normal loads without undue stress, will stretch excessively under this abnormal load and, for this reason, it is necessary to employ a cable of a much greater cross section than would otherwise be employed, to avoid the excessive temporary elongation that would occur in the cables. But this excessive cross section and increased weight of cable that is necessary to meet these contingencies is objectionable. It is due not only to the greater resilience of the steel employed in the cable, but is also due largely to the relatively low pitch of the "wind" or helix of the strands of wire of the steel cables that is necessary in order to make the cable a self-supporting structure. One of the objects of the present invention is to provide a cable capable of withstanding the excessive loads to which such cables are subjected in dives of the plane, or under other abnormal conditions of maneuvering; and which is capable of sustaining such loads without undue stretching, such as would produce a dangerous slack condition of the cable; also to combine these desirable features with lightness as compared with the weight per foot of cables such as now used in present practice. In other words, an important object of this invention is to provide a cable which, weight for weight, for the same strength, will have less stretch than a steel cable that is capable of doing its work; and to provide a cable which will, at the same time, be stiffer, and have less tendency in use to assist in developing flutter in controlled parts.

Another object is to provide a cable constructed in such a way as to permit it to utilize a greater degree of the full strength of the material composing the cable, than is possible with cables employed in present practice.

Another object of the invention is to provide a correlation between the airplane and cables which will minimize the objectionable effects that are now encountered, which arise from relative changes of temperature of the air through which the airplane must fly.

Another object of the invention is to provide a cable and mounting for the same which will minimize the effects resulting from temperature changes and which, at the same time, will enable the cable to be guided in a situation where the runs of the cable extend at an angle to each other.

A preferred embodiment of this invention involves a cable constructed of twisted strands, and one of the objects of the invention is to produce a cable in which the strands composing the cable have a relation which will minimize the objectionable effects of temperature changes; also to provide means in the construction of the cable to maintain the strands of the cable in their proper relation; that is to say, in the relation which they have when delivered ready for mounting in the airplane controls, and at the same time to accomplish this without interfering with the facility with which such cables will lend themselves to inspection.

Further objects of the invention will appear hereinafter.

The principle of our invention we believe to be broadly new and recognize that it may be embodied in other physical structures. We wish our invention, therefore, to be construed in accordance with the preceding statement of invention, broad statements contained in the description of the preferred forms of our invention, and in accordance with the appended claims. Our invention provides certain features which are susceptible of independent use, and it should therefore be understood that our invention is useful not only in its entirety, but different subcombinations and parts are susceptible of independent use.

Referring to the drawing which is for illustrative purposes only,

Fig. 1 is a diagrammatic view and is in the nature of a horizontal section illustrating a portion of a wing and a portion of the fuselage of an airplane, and this view illustrates an embodiment of this invention as it could be applied in a situation such as this, to control an aileron at the end, trailing edge, of the wing. In this view, portions of the structure are broken away.

Fig. 2 is also a section, illustrating a different manner in which the cable can be mounted, where, as in Fig. 1, the operating cable has runs making an angle with each other. In Fig. 1 and also in Fig. 2, the angle of these runs to each other is 90 degrees, but, of course, any angle may be employed to suit the particular requirements.

Fig. 3 is a side view showing the end of a cable embodying this invention, and this view also illustrates an end sleeve on the cable to adapt it to a use such as illustrated in Fig. 2.

Fig. 4 is a cross section upon an enlarged scale, taken about on the line 4—4 of Fig. 3.

Referring to the parts illustrated in the drawings, Fig. 1 illustrates the application of the invention to a situation where a cable must be run longitudinally along an elongated element of the airplane. This elongated element may be the fuselage or it may be a wing. In this view, 1 indicates the side wall of a fuselage 2, that is connected to the inner portion of a wing 3. This view shows a cable end 4 leading laterally from the control position of the flyer, and the tension in this cable end 4, when it is pulled, will exert a pull in a relatively long length 5 of cable which extends longitudinally along the fuselage 1.

In connection with Fig. 1, it should be understood that the cable illustrated is only one of the two cables that would ordinarily be employed for controlling an aileron and, in order to operate the ailerons, the end of the relatively long cable 5 is connected to a laterally extending cable 6 that leads out to guiding means, not illustrated, from which it would be connected to one of the posts that is attached to the aileron for moving it in one direction.

In accordance with this invention, the fuselage 2 and its framing would be constructed of metal and, preferably, Duralumin, and the relatively long length of cable that extends longitudinally with the fuselage would be constructed of a metal having substantially the same composition as that of the fuselage 2 and its framing to which the wing plating is attached.

This relatively long length of cable 5, preferably is composed of a center strand or core 7 and a plurality of wraps of similar strands, that is to say, strands of the same diameter and the same material. These strands are preferably disposed in two inner layers 8 and 8a and an outer layer 9. These layers preferably are composed of six, twelve and eighteen strands respectively (see Fig. 4). The strands that are laid into these layers and built into the body of the cable are wrapped in helices 10, as indicated in Fig. 3, that are preferably wrapped with a pitch that is approximately two and one half turns per foot of cable length; and in practicing the invention, we prefer that this pitch should be between the limits of two turns per foot and three turns per foot.

The end of the cable, as illustrated in Fig. 3, is secured in any well known manner in an anchor sleeve 11, which may be provided with a tongue 12 located in the axial plane of the sleeve; and this tongue may be provided with an eye 13 to receive a bolt for attaching the same to an operating part such as the arm 14 of a bell-crank lever 15, such as illustrated in Fig. 2.

In order to maintain the high pitch cable wraps intact, the body of the cable is enveloped in a sheath 16, of an ethyl cellulose composition, that is known in the trade as Ethocel. This sheath or casing also acts as a protection for the cable against injury to its strands by abrasion and, in order to facilitate the inspection of the cable, the sheath is made of transparent Ethocel, which is a pliable plastic. This enables inspectors after the aircraft is in use, to examine the strands of the cable through the sheath to ascertain whether any of them are frayed or broken.

A further advantage of the covering or sheath placed over the metallic wires of the cable is that it acts to dampen vibration of the cable.

While a cable, constructed as described, will contract and extend in length at approximately the same rate as the metal wing 2, it is incapable of being bent around a small arc, such as would exist at the periphery of the relatively small pulleys that are employed in airplane construction. However, in order to enable a relatively long length of cable, such as the cable 5, to be employed for transmitting a pull around an angle, we provide relatively short cable sections 17, attached to its ends, as illustrated in Fig. 1. These short sections may be constructed of steel or any other material combining strength and flexibility; and capable of passing around a pulley of small diameter, such as the pulley 18, illustrated at the left of Fig. 1, and a pulley 19 located near the forward end of the fuselage for connecting up to the cable 6.

These two short lengths of cable 17 have their ends secured to the cable sections 4, 5, and 6 that are composed of duralumin and which have substantially the same coefficient of expansion as the elongated elements of the airplane such as the fuselage and wing along which the sections 5 and 6 extend. The connection between these sections of cable may be effected, if desired, by means of sleeves 20 in the form of splicing sleeves. However, the length of the cable sections 17 must be such that these splices will not come in contact with the pulleys 18 and 19 at the limits of the movements of the cables in either direction.

In Fig. 2, the bell crank lever 15 is constructed and mounted so that its actuating arm 21 is capable of swinging through approximately sixty degrees, and, of course there should be this same angle of swing for the arm 14. In a cable mounting, as illustrated in Fig. 2, both the cables illustrated would be duralumin cables, as the use of the bell crank lever avoids the necessity for employing a pulley. In a situation where this amount of movement would be insufficient, then of course it would be necessary to use pulleys, such as the pulleys 18 and 19 with short sections of more flexible cable associated with them.

The saving of weight on an airplane is most important. The use of cable embodying this invention, mounted as described, results in a great saving in weight, as compared with other cables now in use and, at the same time, the original tension for which a cable control is designed and set up by the riggers will be maintained under very great variations in temperature, which may vary from minus 80 degrees to plus 180 degrees Fahrenheit.

While various numbers and arrangements of strands may be employed in practicing this invention, we prefer to employ cable having a single center strand with twelve strands in the first wrap or layer and twenty four strands in the outer wrap or layer. Of course the direction of the wrap of the helix in the outer layer or wrap is opposite to that in the first or inner layer.

When the cellulose sheath is being applied to the cable, this of course would be accomplished under great pressure and, on account of such pressure, portions of the sheath will fill the interstices between the outer layer of strands of the cable.

By employing this invention it is entirely practicable to rig the control cables of a large high powered airplane such as referred to above, with an initial rigging tension of 25 pounds, as compared with an initial rigging tension of 60 to 100 pounds with cables constructed and installed in accordance with present practice.

Many other embodiments of this invention may be resorted to without departing from the spirit of the invention.

We claim as our invention:

1. A high strength control cable for use in aircraft control systems comprising: a plurality of wires of high strength aluminum alloy laid together in helical wraps to constitute an aluminum alloy cable; a tubular sheath of material of lesser tensile strength than said aluminum alloy serving to maintain said wires in position and to protect the same; and a length of steel cable connected to at least one end of said aluminum alloy cable to enable said control cable to flex readily around a pulley or the like where used in an aircraft control system by the engagement of said length of steel cable with said pulley.

2. A high strength control cable for use in aircraft control systems comprising: a plurality of wires of a high strength aluminum alloy wound together with a number of turns sufficient only to provide a partly self-sustaining cable body; a tubular sheath enveloping said body to maintain the wires in position and protect them; and lengths of steel cable connected to the respective ends of said wires to enable the article when used in an aircraft control system to flex readily around pulleys by the engagement of said lengths of steel cable with said pulleys.

3. In an aircraft, the combination of: a structural portion formed of a non-ferrous light metal alloy; a control cable extending along said structural portion; said cable consisting of a plurality of helically wrapped strands with a pitch of not more than about three turns per foot, formed of a material which is approximately the same alloy as said structural portion, and has approximately the same coefficient of expansion; and a sheath of relatively low strength material encircling said strands and adapted to increase the bending resistance of said cable without substantially affecting its tensile resistance; whereby said cable will be partially self sustaining and will have approximately the same coefficient of expansion as said structural portion.

4. The construction as set forth in claim 3, in which said relatively low strength material is an ethyl cellulose compound.

5. The construction as set forth in claim 3, in which said relatively low strength material is a transparent plastic.

6. The construction as set forth in claim 3, and in addition thereto: a length of cable of substantially greater flexibility than said first cable attached to the end thereof; said second cable being in contact with a guide to provide a change in the direction of the force applied to said first cable; said second cable being adapted to flex over said guide as said first cable is moved longitudinally.

7. The construction as set forth in claim 3, and in addition thereto: a length of cable of substantially greater flexibility than said first cable attached to the end thereof; said second cable being in contact with a guide to provide a change in the direction of the force applied to said first cable; said second cable being adapted to flex over said guide as said first cable is moved longitudinally, and being of a length slightly greater than the length of movement of said first cable.

EDWARD E. VAN DYKE.
KINGDON KERR.

REFERENCES CITED

The following references are of record in the file of this patent:

UNITED STATES PATENTS

| Number | Name | Date |
|---|---|---|
| 301,888 | Hazelton | July 15, 1884 |
| 389,752 | Lauckert | Sept. 18, 1888 |
| 1,904,116 | Baum | Apr. 18, 1933 |
| 1,919,509 | Grobl | July 25, 1933 |
| 1,955,468 | Noyes | Apr. 17, 1934 |
| 2,067,405 | Mayne | Jan. 12, 1937 |
| 2,070,714 | Dreyfus | Feb. 16, 1937 |
| 2,098,163 | Reed | Nov. 2, 1937 |
| 2,138,420 | Glasser | Nov. 29, 1938 |
| 2,184,502 | Metcalf | Dec. 26, 1939 |
| 2,196,336 | King | Apr. 9, 1940 |
| 2,308,669 | Beed | Jan. 19, 1943 |
| 2,344,917 | Hotchkiss, Jr. | Mar. 21, 1944 |

FOREIGN PATENTS

| Number | Country | Date |
|---|---|---|
| 64,329 | Switzerland | 1913 |
| 148,882 | Switzerland | 1931 |

OTHER REFERENCES

Nickel Steel Topics, April 1939, page 12,